United States Patent
Henley et al.

(10) Patent No.: US 9,477,543 B2
(45) Date of Patent: Oct. 25, 2016

(54) INSTALLATION HEALTH DASHBOARD

(71) Applicants: Miles Henley, Vancouver (CA); Dolan Sum, Burnaby (CA); Alfred Fung, Burnaby (CA); Edward Lam, Vancouver (CA); Tao Lin, Port Coquitlam (CA); Randy Uy, Richmond (CA); Ren Horikiri, New Westminster (CA); Jeff Lavoie, Vancouver (CA)

(72) Inventors: Miles Henley, Vancouver (CA); Dolan Sum, Burnaby (CA); Alfred Fung, Burnaby (CA); Edward Lam, Vancouver (CA); Tao Lin, Port Coquitlam (CA); Randy Uy, Richmond (CA); Ren Horikiri, New Westminster (CA); Jeff Lavoie, Vancouver (CA)

(73) Assignee: Business Objects Software Ltd., Dublin (IE)

(*) Notice: Subject to any disclaimer, the term of this patent is extended or adjusted under 35 U.S.C. 154(b) by 0 days.

(21) Appl. No.: 14/498,301

(22) Filed: Sep. 26, 2014

(65) Prior Publication Data
US 2016/0092338 A1    Mar. 31, 2016

(51) Int. Cl.
G06F 9/44 (2006.01)
G06F 11/07 (2006.01)
G06F 11/36 (2006.01)
G06F 17/30 (2006.01)
G06F 11/32 (2006.01)

(52) U.S. Cl.
CPC ............ *G06F 11/079* (2013.01); *G06F 8/00* (2013.01); *G06F 11/0721* (2013.01); *G06F 11/0769* (2013.01); *G06F 11/32* (2013.01); *G06F 11/366* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 6,681,990 B2 | 1/2004 | Vogler et al. | |
| 6,901,304 B2 | 5/2005 | Swan et al. | |
| 7,149,753 B2 | 12/2006 | Lin | |
| 7,205,897 B2 | 4/2007 | Lin | |
| 7,233,958 B2 | 6/2007 | Weng et al. | |
| 7,331,527 B2 | 2/2008 | Mo et al. | |
| 7,378,969 B2 | 5/2008 | Chan et al. | |
| 7,389,921 B2 | 6/2008 | Lin et al. | |
| 7,482,931 B2 | 1/2009 | Lin | |
| 7,667,604 B2 | 2/2010 | Ebert et al. | |
| 7,737,857 B2 | 6/2010 | Ebert et al. | |
| 7,756,902 B2 | 7/2010 | Lin | |
| 7,802,145 B1* | 9/2010 | Bainbridge | G06F 11/0709 714/38.1 |

(Continued)

*Primary Examiner* — Isaac T Tecklu
(74) *Attorney, Agent, or Firm* — Fish & Richardson P.C.

(57) ABSTRACT

The disclosure generally describes computer-implemented methods, software, and systems for presenting error information. Logs are received from different locations, the logs associated with a plurality of builds at the different locations and associated with one or more systems. The logs are stored in a centralized location. Build information is generated for a given build, including identifying errors associated with the given build. Information for a current log associated with the given build is analyzed, including accessing information for previous logs associated with previous related builds related to the given build. Based on the analyzing, error diagnostic information that is to be presented is determined, including an analysis of errors that occurred in the given build and previous related builds. Instructions are provided, the instructions operable to present the error diagnostic information to a user, including providing log information, for presentation in a user interface.

17 Claims, 12 Drawing Sheets

(56) References Cited

U.S. PATENT DOCUMENTS

| | | |
|---|---|---|
| 7,969,306 B2 | 6/2011 | Ebert et al. |
| 8,019,740 B2 | 9/2011 | Weng et al. |
| 8,386,324 B2 | 2/2013 | Lin |
| 8,417,854 B2 | 4/2013 | Weng et al. |
| 8,768,777 B2 | 7/2014 | Lin |
| 8,887,123 B2 | 11/2014 | Lin et al. |
| 8,935,676 B2* | 1/2015 | Verbest .......................... 714/35 |
| 2006/0212857 A1* | 9/2006 | Neumann ................. G06F 8/20 717/140 |
| 2009/0008450 A1 | 1/2009 | Ebert et al. |
| 2013/0014084 A1* | 1/2013 | Sahibzada ............. G06F 11/368 717/124 |

* cited by examiner

500

Error Information        502 [ File a Bug ]

06:02:59.674 | Property: tp.apache.tomcat.props-6.0.24-core$TomcatRedirectPort = 8443
06:02:59.674 | Property: tp.apache.tomcat.props-6.0.24-core$TomcatShutdownPort = 8005
06:02:59.675 | Property: tp.microsoft.sqlexpress.props-10.0.1600.22-core$SQLExpressAdminUser - sa
06:02:59.675 | Property: tp.microsoft.sqlexpress.props-10.0.1600.22-core$SQLExpressBCEUserName - boeuser
06:02:59.675 | Property: tp.microsoft.sqlexpress.props-10.0.1600.22-core$SQLExpressDatabaseAudit - BOE140_Audit
06:02:59.675 | Property: tp.microsoft.sqlexpress.props-10.0.1600.22-core$SQLExpressDatabaseCMS = BOE140
06:02:59.675 | Property: tp.microsoft.sqlexpress.props-10.0.1600.22-core$SQLExpressDSNAudit = BusinessObjects Audit Server 140
06:02:59.675 | Property: tp.microsoft.sqlexpress.props-10.0.1600.22-core$SQLExpressDSNCMS - BusinessObjects CMS 140
06:02:59.676 | Property: tp.microsoft.sqlexpress.props-10.0.1600.22-core$SQLExpressInstanceName - BOE140
06:02:59.676 | Property: tp.microsoft.sqlexpress.props-10.0.1600.22-core$SQLExpressOsqlDir - undefined
06:02:59.676 | Property: tp.xyz.introscope.props-822-core$Introscope_ENT_HOST = localhost
06:02:59.676 | Property: tp.xyz.introscope.props-822-core$Introscope_ENT_INSTRUMENTATION - false
06:02:59.676 | Property: tp.xyz.introscope.props-822-core$Introscope_ENT_PORT - 6001
06:02:59.676 +----------------------------------------------
06:02:59.677 Changing state of feature root to: NoChange
06:02:59.678 Error: No features set to install from feature list. Attempting to set hidden default-install    501
features which are children of the root feature to install...
06:02:59.806 Changing state of feature installer.runtime to: Install
06:02:59.806 Default object model from product model: 64
06:02:59.810 Detecting product du dir...
06:02:59.907 No manifest under: C:\Users\\InstallManifest.sqlite -- not loading product DU from install dir.
06:02:59.907 Successfully detected product DU dir at: \\build-drops-vc\Dropzone\system_dev\component_pi_install\94\win64_x64\release\patches\BusinessObjectsServer_Patch\dunit\product.boe64.patch-4.0.6-32\
06:02:59.923 LangPackUtil: No lang packs in current installer
06:02:59.923 Note: no available language packs were detected.
06:02:59.986 S-Bank(0x2778370) : :setV create $os.family with Windows
06:02:59.987 S-Bank(0x2778370) : :setV create $os.platform with windows
06:02:59.987 S-Bank(0x2778370) : :setV create $os.processor with x86
06:02:59.987 S-Bank(0x2778370) : :setV create $os.memoryarchitecture with 64
06:02:59.987 S-Bank(0x2778370) : :setV create $os.version with 6.1-SERVER
06:02:59.987 S-Bank(0x2778370) : :setV create $os.servicepack with 1
06:02:59.987 S-Bank(0x2778370) : :setV create $os.distribution.name with MSWindows
06:02:59.987 S-Bank(0x2778370) : :setV create $os.distribution.version with    504

Also seen in:

system41_pi_install 911 win64_x64 BusinessObjectsServer_Patch
System_40_SP_COR 1063 solaris_sparcv9 BusinessObjectsServer_Patch
system41_pi_install 915 win64_x64 BusinessObjectsServer_Patch
system41_pi_install 920 win64_x64 BusinessObjectsServer_Patch
system41_pi_install 922 win64_x64 MiniBIP_Patch
System_40_SP_COR 1065 solaris_sparcv9 Explorer_Patch
system41_pi_install 922 win64_x64 BusinessObjectsServer_Patch
system41 pi install 922 win64_x64 Explorer Patch
...

| | 902<br>STREAM | 904<br>REVISION | 906<br>DATE IN WHICH ERROR OCCURRED | |
|---|---|---|---|---|
| 918 → | System41_pi_install | 99 | 2013/05/28 14:50:31 | ← 908 |
| 912 → | System41_pi_install | 100 | 2013/05/29 14:50:31 | ⎫ |
| | System41_cons | 50 | 2013/05/30 17:20:27 | ⎪ |
| | System41_cons | 51 | 2013/05/31 17:20:27 | ⎪ |
| | System41_rtc_patch | 40 | 2013/06/01 18:20:27 | ⎬ 910 |
| | System41_rtc_patch | 41 | 2013/06/02 18:20:27 | ⎪ |
| 914 → | System41_rtc_patch | 42 | 2013/06/03 18:20:27 | ⎪ |
| 916 → | System41_pi_install | 115 | 2013/06/13 14:50:31 | ⎭ |
| | System41_pi_install | 116 | 2013/06/14 14:50:31 | |

FIG. 9

INSTALLATION HEALTH DASHBOARD

CROSS-REFERENCE TO RELATED APPLICATIONS

This application is a co-pending application of U.S. application Ser. No. 14/498,179 filed on Sep. 26, 2014 entitled "TRACING AND DISCOVERING THE ORIGINS AND GENEALOGY OF INSTALL ERRORS"; the contents of which are incorporated herein by reference.

BACKGROUND

The present disclosure relates to computer-implemented methods, software, and systems for presenting information associated with software builds.

Software systems can include many phases and/or paths, e.g., development, test, production installations, and/or other phases. Some of the phases/paths can overlap, e.g., when errors are corrected and/or as the software is incrementally built. In each phase, software systems can undergo multiple builds. Each build, for example, can include several software components, some of which may already be in production, while other software components may have been corrected and are being built for the first time. Builds can include, for example, a collection of individual installations of products belonging to a product suite. Each build can have an associated installation log that identifies errors associated with the build. There can be several thousand lines in a particular installation log file, which may be free of errors or may have numerous errors interspersed throughout the installation log file. Errors may be corrected at various stages in the software life cycle, and corrected code can be included in various releases and/or pushed to other paths, such as from a test path to a productive path. Some errors that may have been corrected can be re-introduced, such as through pushes from one path to another. Many factors can contribute to the number of errors that occur in an installation log, such as code complexity, the number of people on a project, the number of paths involved, code stability, code size, the number and/or frequency of releases, and other factors. When an error occurs and is included in an installation log, it can be difficult to identify the root cause of the error.

SUMMARY

The disclosure generally describes computer-implemented methods, software, and systems for generating an installation health dashboard. For example, logs associated with a plurality of builds at the different locations and associated with one or more systems can be received from different locations. The logs can be stored in a centralized location. Build information can be generated for a given build, including identifying errors associated with the given build. Generating the build information can include analyzing information for a current log associated with the given build, including accessing information for previous logs associated with previous related builds related to the given build. Generating the build information can further include determining, based on the analyzing, error diagnostic information to be presented, including an analysis of errors that occurred in the given build and previous related builds. Instructions can be provided that are operable to present the error diagnostic information to a user, including providing log information, for presentation in a user interface.

The present disclosure relates to computer-implemented methods, software, and systems for providing error diagnostic information. One computer-implemented method includes: receiving, from different locations, logs associated with a plurality of builds at the different locations and associated with one or more systems; storing the logs in a centralized location; generating build information for a given build, including identifying errors associated with the given build, wherein generating build information includes: analyzing information for a current log associated with the given build, including accessing information for previous logs associated with previous related builds related to the given build and determining, based on the analyzing, error diagnostic information to be presented, including an analysis of errors that occurred in the given build and previous related builds; and providing instructions operable to present the error diagnostic information to a user, including providing log information, for presentation in a user interface.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, each log includes metadata associated with the log and log entries, each log entry including a timestamp.

In a second aspect combinable with any of the previous aspects, the method further includes storing the logs includes storing information for the logs in a schema.

In a third aspect combinable with any of the previous aspects, providing log information includes providing the log with annotations and collapsible sections.

In a fourth aspect combinable with any of the previous aspects, providing log information includes presenting two related logs in a side-by-side viewer with a comparison tool that highlights differences between the two related logs.

The subject matter described in this specification can be implemented in particular implementations so as to realize one or more of the following advantages. First, presenting an installation health dashboard and associated logs can reduce the amount of time needed to investigate the origins and genealogy of install errors. For example, information provided by the system can help to more quickly answer questions such as: Has this error happened before? If yes, has this error been fixed before? When was the first time this error appeared? What action produced this error? Does this error occur in other products in different streams? What is the change that introduced this error?

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 5 shows an example annotated log.

FIG. 9 shows example query results associated with error occurrences in installation streams.

Like reference numbers and designations in the various drawings indicate like elements.

DETAILED DESCRIPTION

This disclosure generally describes computer-implemented methods, software, and systems for providing and presenting an installation health dashboard. For example, the installation health dashboard can provide a one-stop location for information relating to the relative health of a build based on the results of a collection of individual installations of products belonging to a product suite. Users can use an installation health dashboard, for example, to view and more easily digest information associated with the health of one or more active builds, the health of individual installations, errors that are occurring or have occurred in specific installations, and full installation logs. The system, for example, can gather and extract errors contained in the daily install logs received from external systems. Information for the logs and errors can be processed in order to generate and display information useful in determining the origins and genealogy of particular errors.

The installation health dashboard can leverage technology associated with in-memory databases to handle large sets of data, including parsing and storing every single line read from installation logs in the database. Storing entire logs line-by-line can provide the ability to show errors in their context and support error diagnosis. For example, errors can be stored line-by-line in the database, with metadata identifying which particular lines in the log are associated with errors, the time each error occurred, the log line number in which the error occurred, and to which installation execution the error belongs.

In some implementations, a database schema can be used to store information related to logs. For example, storing information in the schema for a log associated with an installation execution can record information such as build number, product information, a type of installation (e.g., new, existing), and/or other information. Within the schema, column data storage can be used to optimize the time to retrieve total counts of aggregate errors, allowing the health of multiple streams and builds to be displayed simultaneously and nearly instantaneously. Streams can be named, for example, and can include development streams, stable streams, and other streams (e.g., test).

Figure 1:
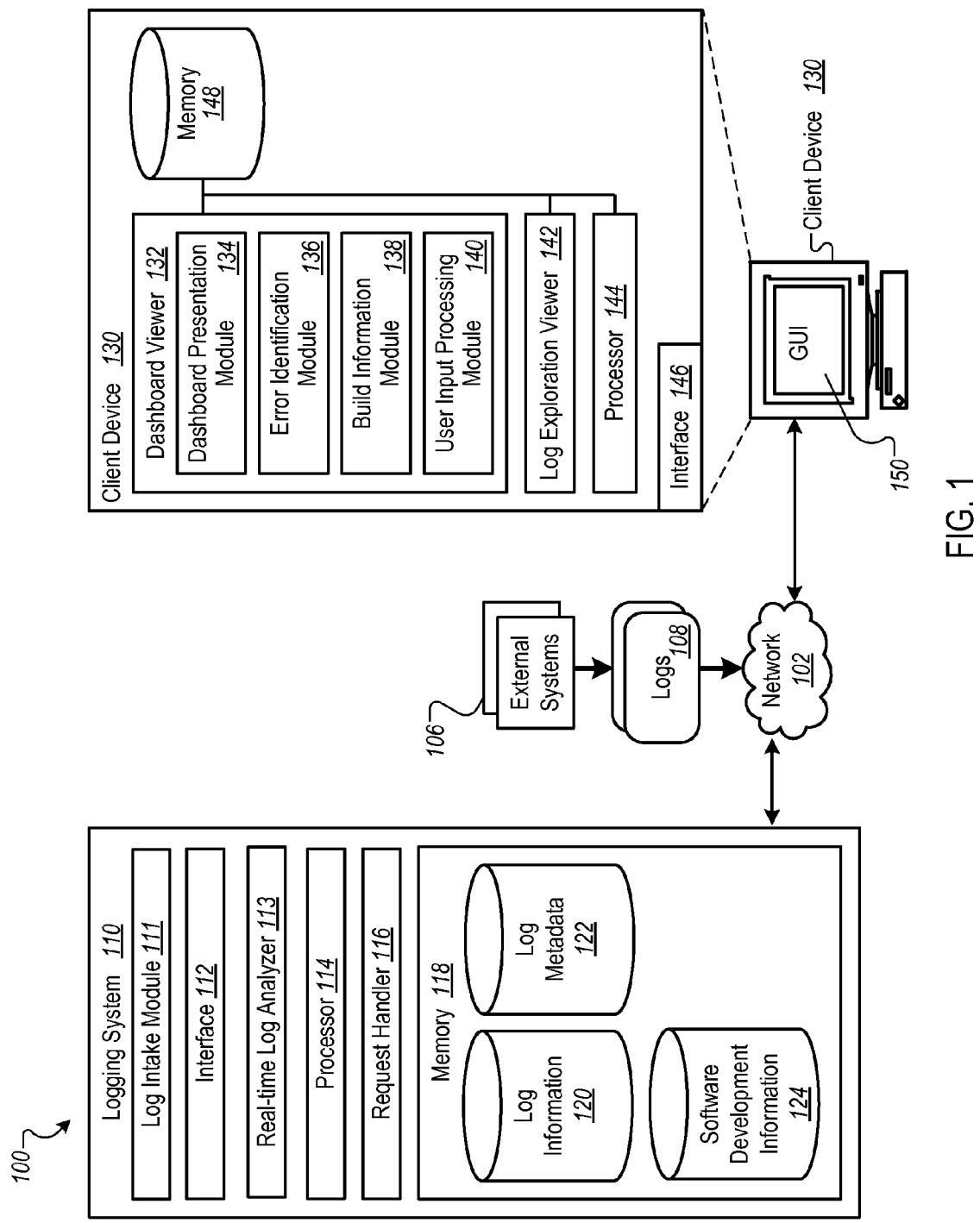
FIG. 1 is a block diagram illustrating an example environment for providing an installation health dashboard.

FIG. 1 illustrates an example environment 100 for providing an installation health dashboard. Specifically, the illustrated environment 100 includes, or is communicably coupled with, a logging system 110, one or more external systems 106, and a client device 130. For example, the logging system can collect a plurality of logs 108 that are associated with software builds at (or for) one or more external systems 106. A user interacting with user interfaces presented on the client device 130, for example, can view an installation health dashboard, including log information, associated with the collected logs 108. For example, the environment 100 can be used to expose information about the origins and genealogy of install errors.

At a high level, the logging system 110 comprises an electronic computing device operable to collect a plurality of logs associated with software builds for one or more systems. A data store of log information 120, for example, can store line-by-line messages from a given log file. For example, using the individual lines that are stored, a given log file can be reproduced in its entirely, such as for display purposes. When a log file is stored, for example, information stored with the log can include build information, including a timestamp and information identifying the source of the log file (e.g., identifying the particular external system 106). In some implementations, the data store of log information 120 can be implemented in whole or in part using a database schema, such as described below with reference to FIG. 6.

A data store of log metadata 122, for example, can include information associated with the individual lines of the log. For example, as a result of processing a received log 108, metadata that is stored can include, for each line in the log, the type of line (e.g., "ERROR"). In some implementations, log information 120 and log metadata 122 can be combined into a single database, e.g., including database tables associated with a schema described below with respect to FIG. 6.

A data store of software development information 124, for example, can include product, release, configuration control, and other information related to software being built. The information can be used during real-time log analysis, e.g., to associate particular errors in a log file to specific releases, versions, software development paths, and/or other information for the purpose of troubleshooting and error analysis.

As used in the present disclosure, the term "computer" is intended to encompass any suitable processing device. For example, although FIG. 1 illustrates a single logging system 110, the environment 100 can be implemented using two or more logging systems 110, as well as computers other than servers, including a server pool. Indeed, the logging system 110 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated logging system 110 may be adapted to execute any operating system, including Linux, UNIX, Windows, Mac OS®, Java™, Android™, iOS or any other suitable operating system. According to some implementations, the logging system 110 may also include, or be communicably coupled with, an e-mail server, a Web server, a caching server, a streaming data server, and/or other suitable server(s). In some implementations, components of the logging system 110 may be distributed in different locations and coupled using the network 102.

In some implementations, the logging system 110 includes a log intake module 111 that processes and receives logs 108 provided by external systems 106. Processing a received log 108, for example, can include parsing the log line-by-line and determining log metadata 122 associated with the log. Processing a received log 108 can also include storing the individual lines of the log in the log information 120. In some implementations, metadata associated with logs can be determined from the parsing as well as information associated with the received log.

A real-time log analyzer 113 can analyze plural logs and identify metadata associated with each log. For example, the analysis can identify which errors in a log are new (relative to previous builds) and which errors originated from one or more previous builds. The information can be used, for example, to populate information included in dashboards related to logs, such as described below with respect to FIG. 2.

The logging system 110 further includes an interface 112, a processor 114, request handler 116, and a memory 118. The interface 112 is used by the logging system 110 for communicating with other systems in a distributed environment, connected to the network 102 (e.g., the client device 130), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The logging system 110 also includes the memory 118, or multiple memories 118. The memory 118 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the logging system 110. Additionally, the memory 118 may include any other appropriate data, such as VPN applications, firmware logs and policies, firewall policies, a security or access log, print or other reporting files, as well as others. In some implementations, memory 118 includes the log information 120 (described above) and software development information 124 (described above). Other components within the memory 118 are possible.

The illustrated environment of FIG. 1 also includes the client device 130, or multiple client devices 130. The client device 130 may be any computing device operable to connect to, or communicate with, at least the logging system 110 via the network 102 using a wire-line or wireless connection. In general, the client device 130 comprises an electronic computer device operable to receive, transmit, process, and store any appropriate data associated with the environment 100 of FIG. 1.

The illustrated client device 130 further includes a dashboard viewer 132. The dashboard viewer 132, for example, can present dashboard and log information to the user. To generate the information needed to support the dashboard, for example, the dashboard viewer 132 can access log information associated with the user selections. The dashboard viewer 132 is any type of application that allows the client device 130 to request and view content on the client device 130. In some implementations, the dashboard viewer 132 can be and/or include a Web browser. In some implementations, the dashboard viewer 132 can use parameters, metadata, and other information received at launch to access a particular set of data from the logging system 110. Once a particular dashboard viewer 132 is launched, a user may interactively process build, log, or other information associated with the logging system 110. Further, although illustrated as a single dashboard viewer 132, the dashboard viewer 132 may be implemented as multiple dashboard viewers 132 in the client device 130.

A dashboard presentation module 134, included in the dashboard viewer 132, for example, can present a dashboard that includes build information for a subset of the builds based on the collected logs. For example, the dashboard presentation module 134 can present the dashboard described below with reference to FIG. 2.

An error identification module 136, included in the dashboard viewer 132 for example, can identify specific errors in and statistics for a given build. For example, the error identification module 136 can evaluate lines in a log and identify the associated errors, such as based on a line type for line-by-line entries that are stored for the log.

A build information module 138, included in the dashboard viewer 132 for example, can provide associated build information including information for past builds related to the given build. For example, builds that are identified can be associated with the same or different stream, e.g., a development stream, a stable stream, or some other stream.

A user input processing module 140, included in the dashboard viewer 132 for example, can receive user inputs from a user, including user selections for one or more logs to be displayed. For example, the user input processing module 140 can process user inputs received while the user is interacting with dashboards and/or logs described below.

A request handler 116, e.g., included in the logging system 110, can handle requests received from the client device 130. Specifically, the request handler 116 can process data requests or other requests generated by the dashboard viewer 132 (or its components 134-140) and the log exploration viewer 142. In some implementations, the request handler 116 can also process requests received from other sources in addition to client devices 130, e.g., requests received from external systems 106.

The illustrated client device 130 further includes an interface 146, a processor 144, and a memory 148. The interface 146 is used by the client device 130 for communicating with other systems in a distributed environment—including within the environment 100—connected to the network 102, e.g., the logging system 110, as well as other systems communicably coupled to the network 102 (not illustrated). Generally, the interface 146 comprises logic encoded in software and/or hardware in a suitable combination and operable to communicate with the network 102. More specifically, the interface 146 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 130 includes the processor 144. Although illustrated as the single processor 144 in FIG. 1, two or more processors 144 may be used according to particular needs, desires, or particular implementations of the environment 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the client device 130. Specifically, the processor 144 executes the functionality required to send requests to the logging system 110 and to receive and process responses from the logging system 110.

The illustrated client device 130 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 130. Additionally, the memory 148 may include any other appropriate data, such as VPN applications, firmware logs and policies, firewall policies, a security or access log, print or other reporting files, as well as others.

The illustrated client device 130 is intended to encompass any computing device such as a smart phone, tablet computing device, PDA, desktop computer, laptop/notebook computer, wireless data port, one or more processors within these devices, or any other suitable processing device. For example, the client device 130 may comprise a computer that includes an input device, such as a keypad, touch screen, or other device that can accept user information, and an output device that conveys information associated with the operation of the logging system 110 or the client device 130 itself, including digital data, visual information, or a graphical user interface (GUI) 150, as shown with respect to and included by the client device 130. The GUI 150 interfaces with at least a portion of the environment 100 for any suitable purpose, including generating a visual representation of a Web browser. In particular, the GUI 150 may be used to view and navigate various Web pages located both internally and externally to the logging system 110.

Figure 2:
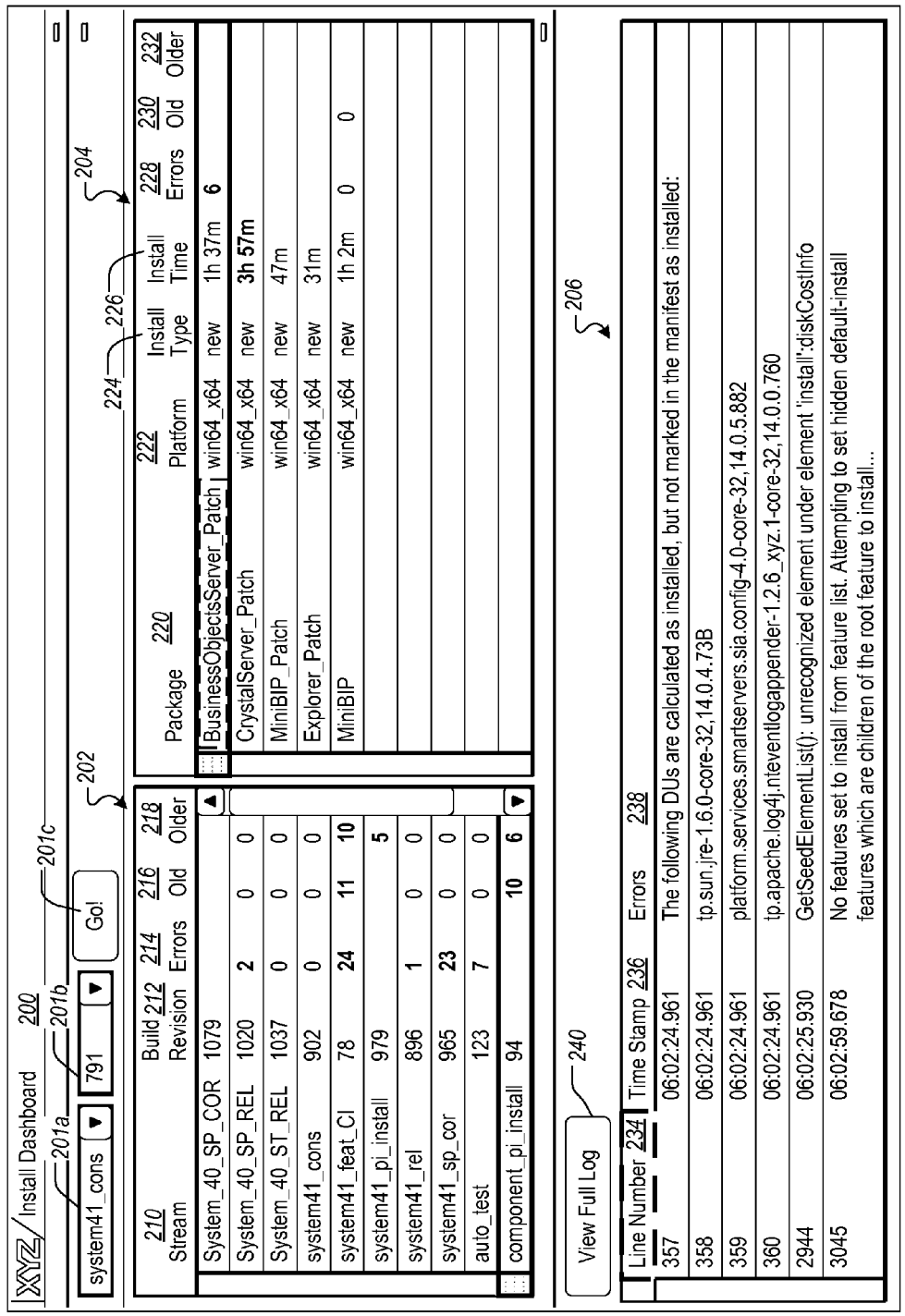
FIG. 2 shows an example installation health dashboard.

FIG. 2 shows an example installation health dashboard 200. The installation health dashboard 200 (or "dashboard" 200) can include hierarchical selection controls and panels for selecting and displaying information for a subset of the builds, and log selection controls and panels for providing log information. Panels can include, for example, a streams view 202, a product installations view 204, and a selected installation view 206. Other suitable panels are possible and can be included in alternative implementations and examples. The views 202-206 can be hierarchical and/or linked, such as containing content that is selected and/or updated based on selections in a higher/previous panel. For example, information provided in the product installations view 204 can be based on user selections in the streams view 202, and log information provided in the selected installation view 206 can be based on user selections in the product installations view 204. Other types of relationships can also exist between the views 202-206 and other information in the dashboard 200 and/or other sources. In some implementations, the dashboard 200 can be provided as a web user interface that provides a hub of installation information in which, in only a few clicks and/or other inputs, a user can interact with information associated with builds, logs, and other information. In some implementations, the dashboard presentation module 134 can present the dashboard 200, e.g., using information from the log information 120 and log metadata 122. These and other sources, for example, can include the tables 602-608 described below with reference to FIG. 6.

A user can use the dashboard 200, for example, to display information for build streams, package subcomponents of a particular build, and to view a log associated with a user-selected build, among other uses. For example, a user can use controls 201 to specify and/or select specific build information that is to be presented on the dashboard 200. Build streams associated with the user selections can be presented in the streams view 202, from which the user can make a selection for a particular build to be displayed in the product installations view 204, which can list specific product associated with the build. By selecting a particular one of the entries in the product installations view 204, corresponding log information can be presented in the selected installation view 206.

For example, the user can select a specific build for which to view results by first selecting a particular stream from a streams dropdown menu 201a, followed by selecting an available build number from the build number dropdown 201b, and selecting (e.g., clicking) a "Go" control 201c. Once a build is selected, both the streams view 202 and the product installations view 204 can be updated to reflect the selection, and the user can perform error drill downs or other actions. In some implementations, the streams dropdown menu 201a can be populated by querying a streams table 602 for all available streams with installation data. The build number dropdown 201b can be populated once a selection has been made in the streams table 602 by querying for all available build numbers that have been associated with the given stream. Selecting the "Go" control 201c can cause updates to both the streams view 202 and product installations view 204 with the information specific to that build. In some implementations, the user input processing module 140 can process user inputs received that are associated with the controls 201 and/or other controls on the dashboard 200.

Information included for each build stream presented in the streams view 202 can include, for example, a build stream name 210, a build revision identifier 212, an error count 214, a previous build error count 216, and an older build error count 218 (e.g., for error counts before the previous build). The information can be used, for example, to compare the numbers and types of errors that have occurred in similar builds. A specific build can be selected by the user, for example, for presenting more detailed information in the product installations view 204.

Using the streams view 202, for example, a user can see the number of errors in all installed products in the latest build of each active development stream. In some implementations, the user can filter and sort each column in the streams view 202 to search for streams that match certain criteria, making the results easier to manage if there are many active streams. Color-coded error count results that are displayed can allow a user to quickly see if there are errors in a stream or not, as well as whether the errors are new in regards to the previous build. If a given number is green, for example, there are zero new errors. If a given number is orange, for example, there are errors but they are not new. If the number is red, for example, there are new errors in the current (e.g., today's) build. Other colors or visual indicators can be used for annotating information, including numbers and types of errors. Bolding is used in FIG. 2 to indicate new errors, e.g., that might instead be represented using red text.

Generation (e.g., by the real-time log analyzer 113) of information in the streams view 202, for example, can include latest build numbers that are calculated getting the MAX value for each unique stream stored in the database. For example, the generated information can make use of information stored by the log intake module 111. As an example, at log intake time, lines determined to be errors can be stored or associated with an "Error" line type. Errors can be counted for each install entry that matches the specific build, e.g., to calculate the error count for that stream. In some implementations, error counts for previous builds can be calculated by joining SQLSCRIPT calculation views that count the number of lines with the error type in a specific build and its identified predecessors. Other ways for determining, annotating and grouping errors can be used.

Information for a selected build that is displayed in the product installations view 204 can include, for example, a package name 220, a platform name 222, an install type 224, an install time 226, an overall error count 228, an old error count 230, and an older error count 232. The information can be used, for example, to view install times and other information for package components of the selected build. Also, error counts that are presented can indicate how the errors are distributed across the different packages of the build. For example, totals of the overall error counts 228, the old error counts 230, and the older error counts 232 correspond error counts displayed in the streams view 202 for the selected build. Based on a particular selected entry selected by the user from the product installations view 204, log information for the selected entry can be presented in the selected installation view 206.

Using the product installations view 204, for example, a user can see the number of errors in each product installation of the currently-selected build from the streams view 202 that have been run and recorded. In some implementations, a user can filter and sort each column in search of product installations that match certain criteria, such as to make the results easier to manage if there is a large number of installations recorded. Color-coded error count results, for example, can allow a user to quickly see if there are errors in a particular installation or not, as well as whether the errors are new or not from the previous build. If the number is presented in green, for example, there are zero errors. If the number is presented in orange, for example, there are errors but they are not new. If the number is presented in red, for example, there are new errors in today's build.

For each product, installation times can be displayed to indicate whether an installation actually completed in an appropriate amount of time or not. If the install time for that install is outside of a couple standard deviations of an average install completion time, the install time can be displayed in red, or otherwise can be displayed in green. For example, if an installation completes in 10 minutes, such as due to ending prematurely, when the average install time is 90 minutes, the installation time can be displayed in red.

Generation (e.g., by the real-time log analyzer 113) of information in the product installations view 204, for example, can occur when the user selects a line on the streams view 202. Generation of information can be used to populate the list of installations for the selected build. For example, a number of lines with "Error" as the line type can be counted for each install entry that matches the specific build. Error counts for installations of the previous build can be calculated by joining SQLSCRIPT calculation views that count the number of lines with the "Error" type in installations of a specific build and its calculated predecessors.

The selected installation view 206, for example, can present information for a given installation (e.g., for a selected entry in the product installations view 204). For example, information included for each error in the log can include a line number 234, a timestamp 236, and an error message 238.

Using the selected installation view 206, for example, a user is able to see a list of all errors occurring in a particular installation based on what installation was selected in the product installations view 204. By selecting a particular error, for example, an overlaid view can appear showing the error in the context in which it occurred as well as information about streams and builds it has previously occurred, as described below with reference to FIG. 5.

Generation (e.g., by the real-time log analyzer 113) of information in the selected installation view 206, for example, can include a list of errors populated from the database using an execution identifier of the installation selected in the product installations view 204. In some implementations, selecting (e.g., clicking on) an error to see the context can query a lines table 608 in the log information 120 for a predetermined number (e.g., 15) of lines to be displayed before and after the occurrence of the error.

Using a display fill log control 240, for example, the user can display a full log for a selected install, e.g., the full log for the installation that is currently selected in the product installations view 204. In some implementations, log file that is displayed can have a similar format as that shown for log file entries in FIG. 5. For example, each line in the log file can include a timestamp and a message line. The log file can be fully scrollable, e.g., vertically, and if needed, horizontally. Controls can be included that allow the user to search or filter information. To generate the full install log, for example, lines table 608 can be queried for all lines that share the same execution identifier (e.g., INSTALLEXECTION 618). The retrieved information can then be ordered and displayed based on the associated line number stored in the table.

Figure 3:
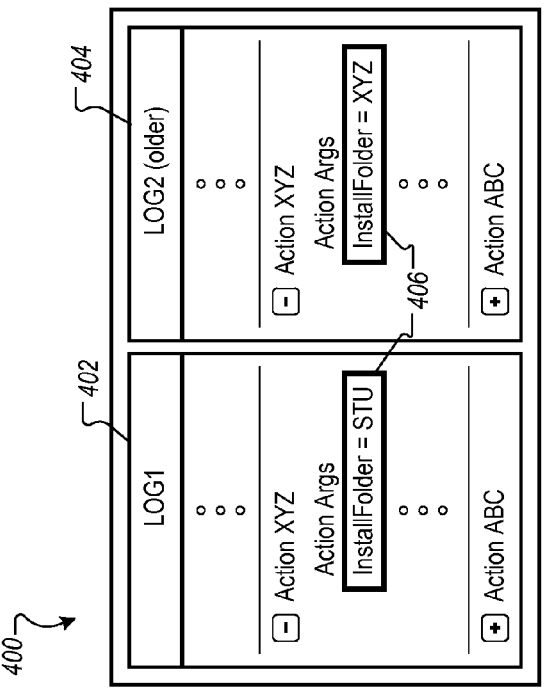
FIG. 3 shows an example layout of a log viewer tool.

FIG. 3 shows an example layout of a log viewer tool 300. For example, the log viewer tool 300 can be used to provide log information, including providing the log with annotations and collapsible sections. The log viewer tool 300 can provide an easy-to-use interface in order to navigate, view, compare, and search product installation logs, such as to determine or isolate the cause of an error. In some implementations, the user input processing module 140 can process user inputs received in association with the log viewer tool 300 and other logs and log tools.

The log viewer tool 300 can include, for example, a sidebar navigation panel 302 for displaying an indicator bar 304 in order to communicate where in the log a viewing pane 306 is currently positioned (e.g., on a per product basis, such as Prod Seq 1, Prod Seq 2, etc.). Both the sidebar navigation panel 302 and the viewing pane 306 can break the log file down into important sections/phases of the installation and uniquely color code each section them for easier visibility.

In some implementations, sections of the log can include collapsing/expanding controls 308 that the user can use, for example, to selectively collapse or expand particular sections of the log that are displayed in the viewing pane 306. Use of the collapsing/expanding controls 308, for example, can provide a more simplified and higher-level view and control the amount of information that the user sees. In some implementations, individual sections in the viewing pane 306 can include scroll controls for scrolling within a particular section.

In some implementations, jump-to action/sequence controls (e.g., implemented using right mouse clicks), can be used on a specific line in the viewing pane 306 to jump to an associated action or sequence. For example, the action or sequence may be in a different part of the log.

In some implementations, to improve visibility, highlighting and/or color-coding can be used on occurrences of particular keywords, e.g., that are relevant to installs. For example, install-related keywords that are annotated in this way can be related to installation functions such as Property, Action, ProductSequence. Other content in the logs can be highlighted or color-coded.

A properties pane 310, for example, can be used to display current property values that can change at different places in the log. For example, the properties pane 310 can display (and continuously update) values of installation properties that contextually change depending on the current position of the viewing pane 306 within the log.

In some implementations, right-clicking a line in the viewing pane 306 (or performing some other action) can provide the user with a tool for comparing the currently-displayed log against same sections/lines in another log (e.g., of the same product). For example, two or more logs can be compared, as described below with respect to FIG. 6.

In some implementations, next/previous controls 312 (e.g., buttons) can be provided. For example, the next/previous controls 312 can allow the user to jump to the next/previous errors in the installation log.

Search/filter controls 314 can be provided, for example, to allow the user to search for specific text in the installation log and/or to filter out specific information. Filtering, for example, can be used to display certain types of log entries and to hide other specific filtered-out entries.

Figure 4:
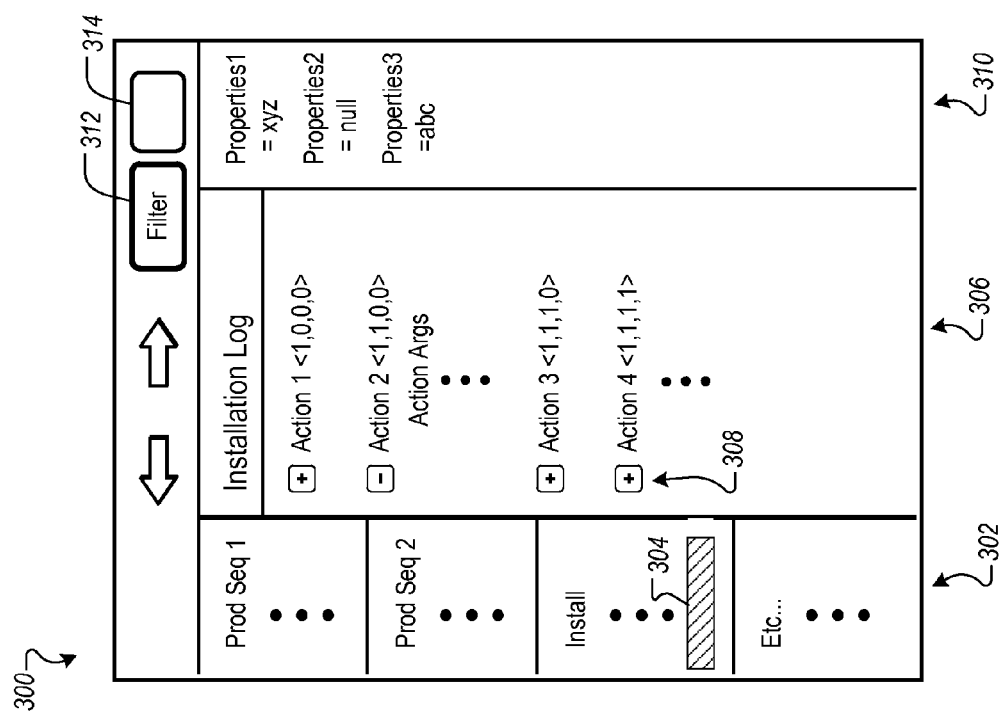
FIG. 4 shows an example layout of a log comparison tool.

FIG. 4 shows an example layout of a log comparison tool 400. For example, the log comparison tool 400 can provide log information including presenting two related logs in a side-by-side viewer with a comparison tool that highlights differences between the two related logs. The log comparison tool 400 can provide, for example, a synchronized side-by-side view of the two logs, such as a first log 402 and an older log 404. The logs 402, 404 may be for the same product, and as such, may share many common entries, except for differences in errors and/or particular properties. In some implementations, differences between the two logs 402 and 404 can be marked in a different color, font, or other distinguishing visual characteristic in order to provide easy visual comparison. Identifying differences in similar logs can allow the user to determine what has changed between the two installations. In some implementations, the log comparison tool 400 can include some of the same features as described above with respect to FIG. 3, such as collapsing/expanding controls, jump-to action/sequence controls, properties pane, next and previous controls, search/filter controls, and other controls.

FIG. 5 shows an example annotated log 500. For example, the annotated log 500 can be associated with and can identify/include a specific error 501. In some implementations, the annotated log 500 can provide log information, including providing the log with annotations and collapsible sections. Annotations can include, for example, the use of distinguishing color(s) for errors, such as red. As shown in FIG. 5, bolding is used for annotating the specific error 501. The annotated log 500 can provide a control 502 to file a bug for that specific error. Clicking the control 502, for example, can launch a defect tracking system in another web browser window on a new defect page that is pre-populated with all the relevant information relating to this error stored in the database. This information can include, for example, associated stream information, a build number, and information for the phase of the installation in which the error occurred. An "Also seen in" section 504 can display other products, platforms, streams, and builds in which the error has previously occurred. To obtain a list of all other occurrences of this error, the real-time log analyzer 113 can query the lines table 608 for the execution identifiers of each install in which this error occurs. In turn, the execution identifier can be used to query the other tables for the related stream, build, product, and platform information. In some implementations, the user input processing module 140 can process user inputs received in association with the control 502 and/or other controls used with the annotated log.

In some implementations, defects filed in a defect tracking system that are associated with the specific error 501 can have a unique key recorded both in the database as well as the summary field in the defect tracking system. The association can provide the ability to determine, by cross-reference, if a bug has already been filed for a specific error. If a bug already has been filed, for example, then the control 502 can be replaced with a link to the existing defect reported/recorded in the defect tracking system.

Figure 6:
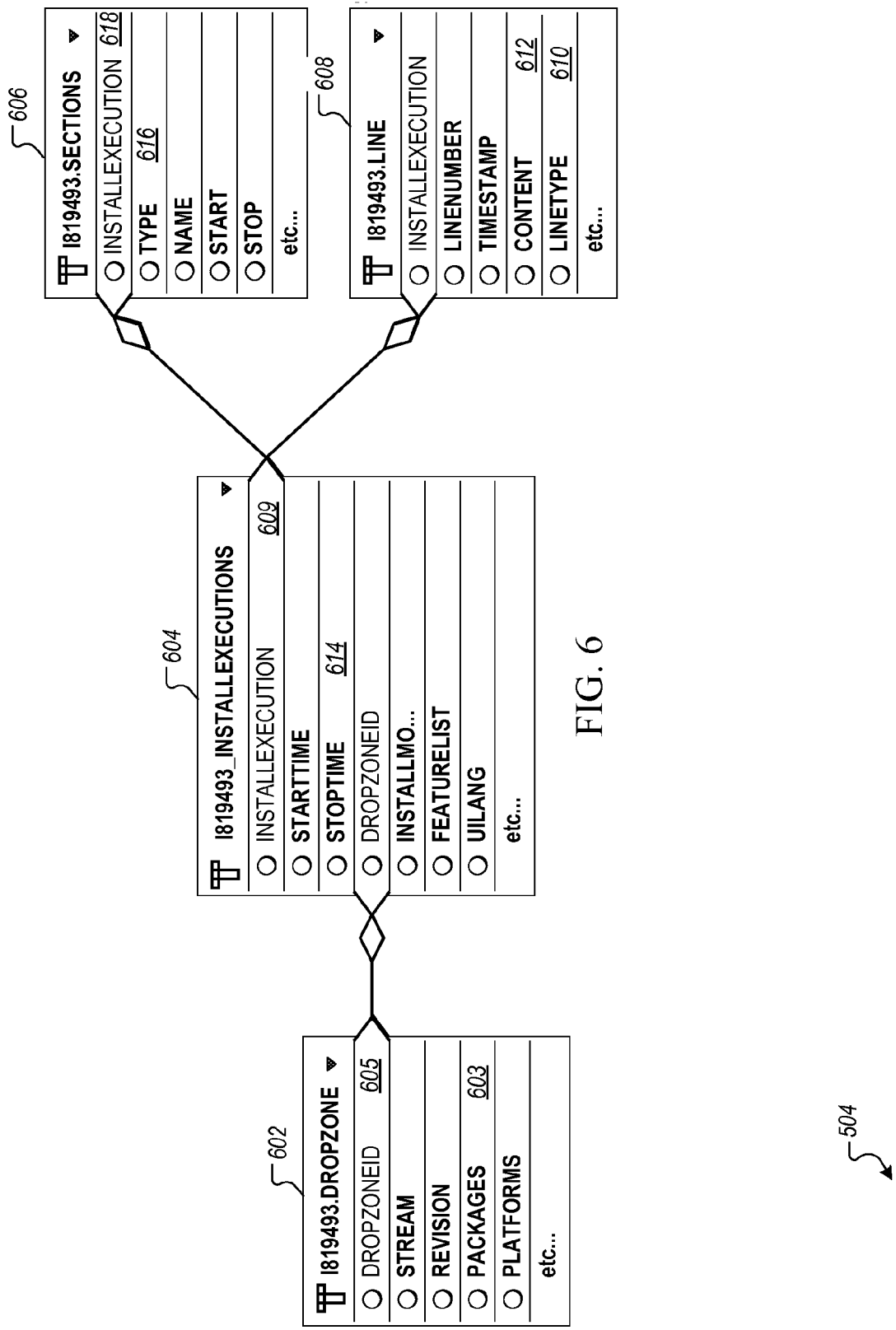
FIG. 6 shows example database schema tables for installation logs.

FIG. 6 shows example database schema tables for installation logs. For example, the schema tables can be part of a schema that is used for log files received by the logging system 110 in which each line in the log is parsed and stored. Further, the schema can support queries that are run to search for information about logs, builds, errors, and/or associated information.

A builds table 602, for example, can identify builds that are dropped into the schema. The builds table 602 can identify products (e.g., PACKAGES 603) and stream information. An installs table 604 can contain general install log information associated with a particular execution, and corresponds to an install log file. Rows in the builds table 602 and the installs table 604 can be associated, for example, using a DROPZONEID column field 605, e.g., the primary key of the builds table 602.

A sections table 606 can contain different sections that correspond to specific actions. A lines table 608, for example, can contain a row for each line in a log file. Rows in the sections table 606 and the lines table 608 can be associated with a particular installation, for example, using an INSTALLEXECUTION column 609. Other tables, columns and relationships are possible. The following paragraphs show how the schema, used with the dashboard 200 and corresponding logs, can be helpful in identifying genealogy of errors.

Figure 7:
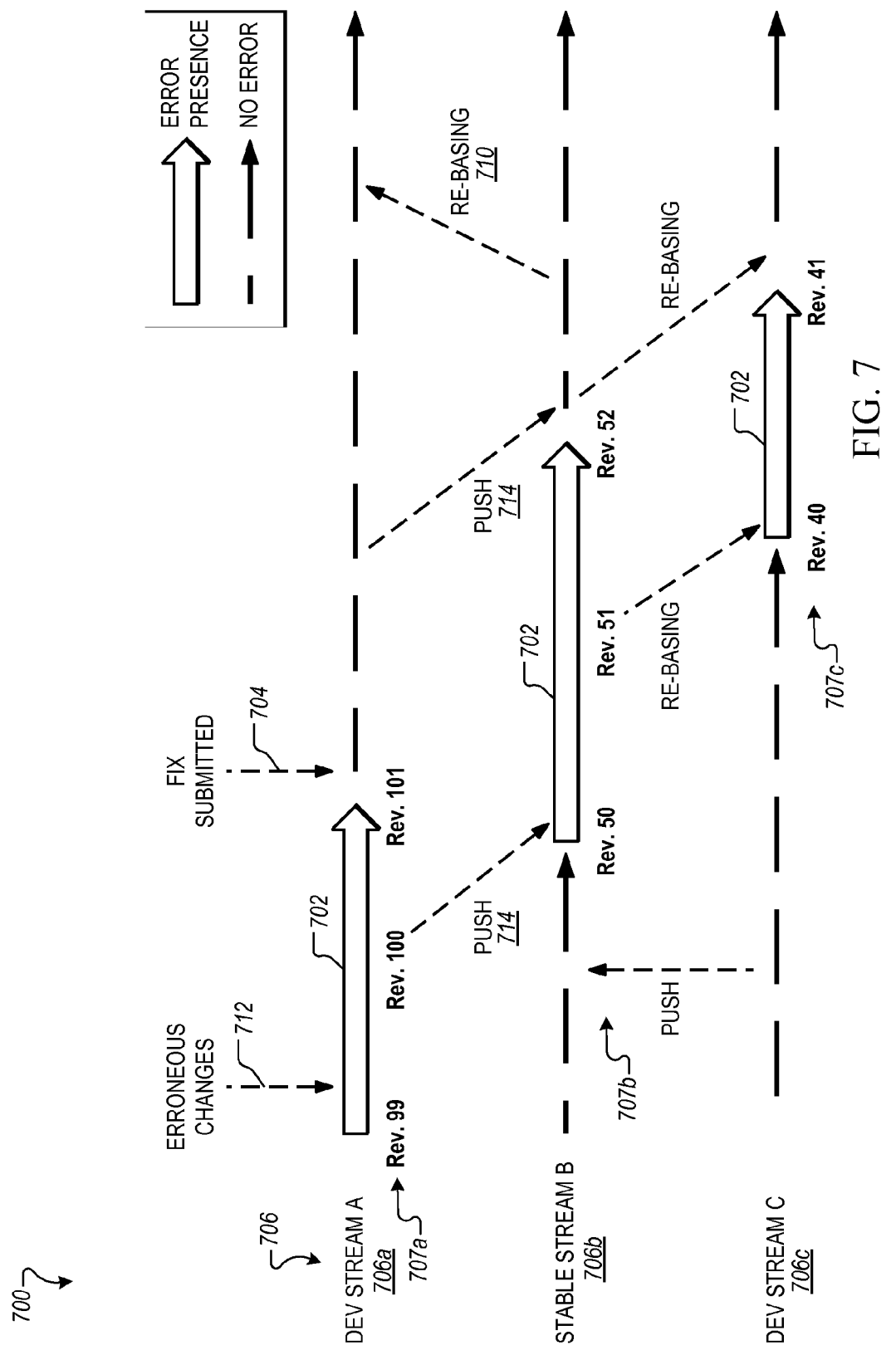
FIGS. 7 and 8 are diagrams are diagrams showing example stream-related processes in which errors are present.
Figure 8:
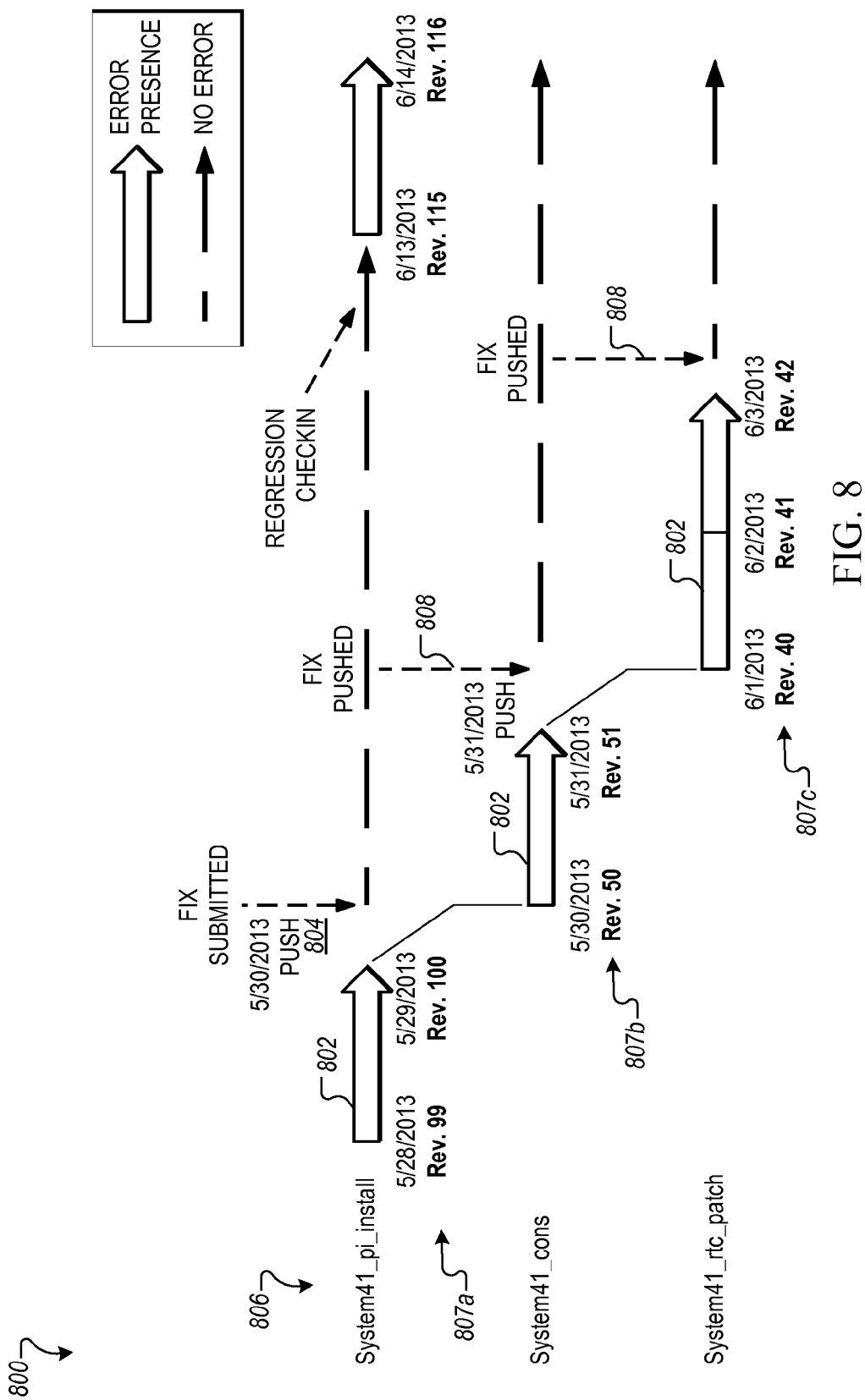

FIGS. 7 and 8 are diagrams showing example stream-related processes 700, 800 in which errors are present. For example, the processes 700, 800 indicate example timelines associated with the presence of errors 702, 802 and associated error fixes 704, 804 and associated streams 706, 806, respectively. Installations 707a-707c and 807a-807c can include, e.g., daily (or other scheduled or nonscheduled) installations for the associated streams 706, 806. The streams 706, 806 can be integrated, for example, with an automation build framework that fetches source code from a source control system and builds products in different streams. In some implementations, a different test automation system can execute the installation for all those products, and each installation can create a log file. The dashboard 200, for example, can be instrumental in identifying errors such as errors produced and fixed in the streams 706, 806.

In some implementations, the streams 706, 806 can be associated with a stream integration and check-in process. For example, a stream can be categorized as either a development stream, e.g., in which developers check in frequently as needed, or a stable stream, e.g., in which check-ins are controlled through code pushes and scheduled to maintain maximum code stability. In some implementations, there is commonly one stable to many development streams relationship in a large project. "Pushing" (e.g., pushes 808) entails integrating new (since the last push) changes from a single development stream to the stable stream after those changes have been validated via testing to be considered stable. Lightweight testing of the stable stream can occur daily to validate that there have been no major regressions. Upon achieving a major regression free build, for example, the build can be marked as the "greatest".

The code level for the "greatest" build can then be pushed back to the development streams so they can utilize the latest stable code developed in sibling development streams. This code push back to the development streams is known as "re-basing" (e.g., re-basing 710). Erroneous changes that are not detected in the daily testing of the stable stream can therefore be propagated to multiple development streams when a "greatest" build is declared and all streams rebased off of it.

Referring again to FIG. 7, if a developer submits erroneous changes 712 to a development stream 706a, then the erroneous changes can end up being propagated (e.g., in pushes 714) to other streams 706b, 706c. By the same token, beneficial changes (e.g., error fixes 704) can also be propagated, e.g., by way of pushes 714, to other streams. The dashboard 200 and associated tools can help to identify situations in which bugs have been introduced. In some implementations, tools accessible from the dashboard 200 or other sources can provide timelines representing error presence with respect to associated streams, e.g., in the same or different format as the processes 700, 800.

FIG. 9 shows example query results 900 associated with error occurrences in installation streams. For example, queries can be executed against the tables 602-608 of the schema 600 described above. As an example, a query can be used to extract CONTENT 612 values from the lines table 608 when the LINETYPE 610 is of type ERROR, the values being error descriptions. The example query results 900 indicate streams 902, revisions 904, and date-timestamps 906 for which the error occurred.

In some implementations, queries can be used to identify error-specific information. For example, a query can be executed against the tables 602-608 to extract all instances where the CONTENT value has a match and the STOPTIME 614 value is prior to the date of the installation. For example, the STOPTIME 614 value can contain the date and time of when an installation completed. The executed query can answer the question, "Has this error happened before? If yes, has the error been fixed before." A time gap, if one exists between the dates in the records, can indicate that the error happened in the past but did not show up for a period of time. For example, this can indicate that the error was most likely resolved at some point in the past. Other explanations for the error's disappearance can be a result of a broken build or some other reasons.

In the query results 900, for example, the error's first appearance 908 is May 28 (revision "99") in the stream 902 of "System41_pi_install." The error occurred for the same stream 902 on May 29 (revision "100"). A gap 910 indicates an absence of the error until June 13. This indicates, for example, that the error was most likely fixed on May 30 but was somehow re-introduced back into the stream 902 of "System41_pi_install."

From the table, we can see that the error occurred in the stream System41_pi_install on 2013 May 29 and stopped occurring between 2013 May 30 (912) and 2013 Jun. 3 (914). The error then reappeared again on 2013 Jun. 13 (916). Most likely the bug was re-introduced. The first record 918 can answer the question "When was the first time this error appeared?" In the example, the first error occurred on 2013 May 28

Figure 10:
FIG. 10 shows an example annotated log and related build information.

FIG. 10 shows an example annotated log 1000 and related build information 1002. For example, the annotated log 1000 can be associated with a query executed against the sections table 606 where the value of TYPE 616 is "ACTION." The purpose of the query, for example, can be to determine which action (e.g., a specific function call within a DLL) produced the associated error. In some implementations, the results of the query can be listed in a view, such as by displaying the annotated log 1000, that includes the context surrounding the error. As shown in FIG. 10, for an action 1004, e.g., "StopBOBJTomcat," the related component 1006 is TomcatConfig.dll. This information can answer the question, "What action produced this error?" The information can be used, for example, to narrow down which component and function caused the error, making further investigation quicker and easier.

Figure 11:
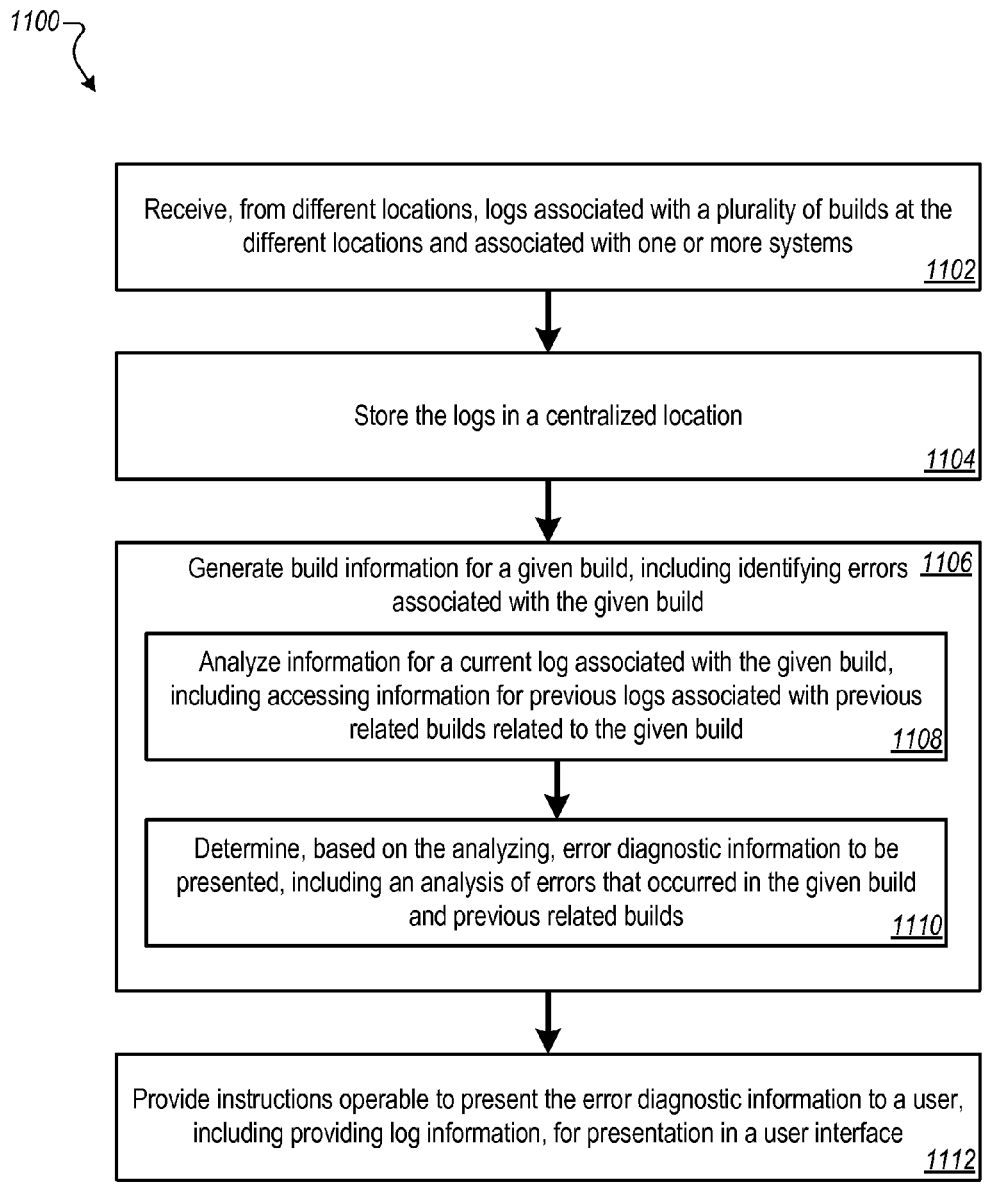
FIG. 11 is a flowchart of an example method for providing instructions operable to present error diagnostic information to a user.

FIG. 11 is a flowchart of an example method 1100 for providing instructions operable to present error diagnostic information to a user. For clarity of presentation, the description that follows generally describes method 1100 in the context of FIGS. 1-10. However, it will be understood that the method 1100 may be performed, for example, by any other suitable system, environment, software, and hardware, or a combination of systems, environments, software, and hardware as appropriate. For example, the logging system 110 and/or its components can be used to execute the method 1100, e.g., using information accessed from the tables 602-608, and in coordination with the client device 130.

At 1102, logs are received from different locations, the logs associated with a plurality of builds at the different locations and associated with one or more systems. For example, the logging system 110 can receive logs 108 from external systems 106.

In some implementations, each log includes metadata associated with the log and log entries, and each log entry includes a timestamp. For example, log entries, or individual lines of a received log, can contain information that is stored in the schema, represented by tables 602-608.

At 1104, the logs are stored in a centralized location. For example, the logging system 110 can store the information in the data store of log information 120 and/or the log metadata 122.

In some implementations, storing the logs includes storing information for the logs in a schema. For example, the information can be stored in the tables 602-608 described above.

At 1106, build information is generated for a given build, including identifying errors associated with the given build. The logging system 110, for example, can identify information for a specific build that the user selects from the dashboard 200.

At 1108, information for a current log associated with the given build is analyzed, including accessing information for previous logs associated with previous related builds related to the given build. For example, the real-time log analyzer 113 can analyze log information obtained from the tables 602-608 for a currently selected build and identify information for associated builds from the tables 602-608.

At 1110, based on the analyzing, error diagnostic information that is to be presented is determined, including an analysis of errors that occurred in the given build and previous related builds. For example, the real-time log analyzer 113 can determine information that is associated with the streams view 202, including information that identifies errors in the current build and errors in previous builds.

At 1112, instructions are provided, the instructions operable to present the error diagnostic information to a user, including providing log information, for presentation in a user interface. For example, the logging system 110 can provide the information to the client device 130, e.g., in response to a selection by the user on the dashboard 200.

In some implementations, providing log information includes providing the log with annotations and collapsible sections. For example, referring to FIG. 3, the logging system 110 can provide instructions to the client device 130 for displaying a log using the log viewer tool 300, for which a log being displayed in the viewing pane 306 can include collapsible sections.

In some implementations, providing log information includes presenting two related logs in a side-by-side viewer with a comparison tool that highlights differences between the two related logs. For example, referring to FIG. 4, two different logs can be provided, such as logs 402 and 404. Differences 406 in the logs can be highlighted.

Figure 12:
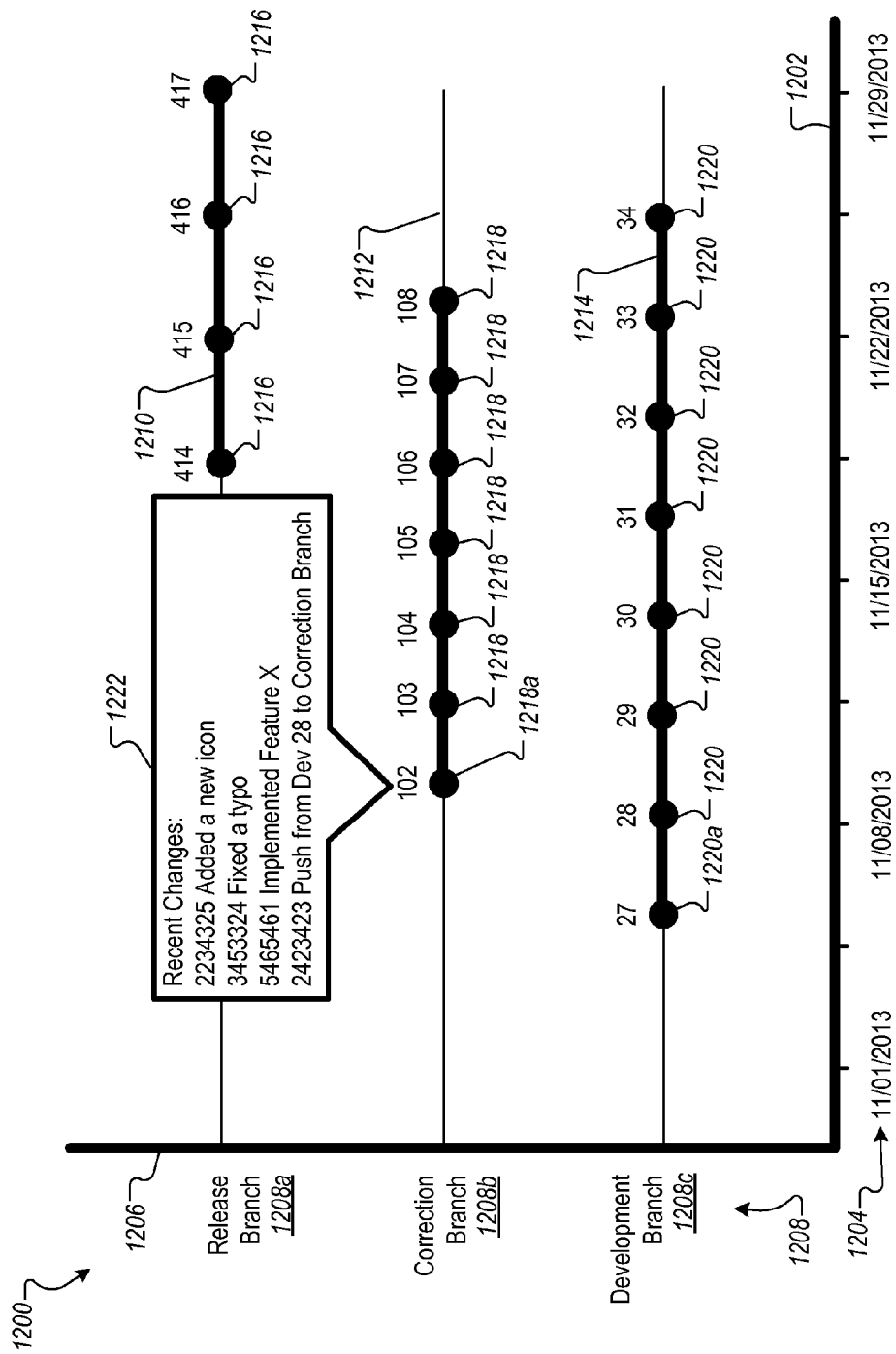
FIG. 12 is a diagram of an example graph showing the presence of an error in builds associated with parallel streams.

FIG. 12 is a diagram of an example graph 1200 showing the presence of an error in builds associated with parallel streams. The graph 1200 includes a time element that allows the user, for example, to quickly digest the presence of the error within parallel streams and related by time. For example, the graph 1200 includes an X-axis 1202, e.g., associated with time and labeled with dates 1204. A Y-axis 1206, for example, is labeled with different streams 1208, such as streams related to product releases, correction paths, and development paths. In some implementations, an error's existence in specific builds can be represented as dots on the graph 1200 on lines corresponding to different streams represented in the graph 1200, for example, using different colors.

Lines 1210-1214 in the graph 1200, for example, indicate the presence of an error over time within time periods associated with each of corresponding ones of the different streams 1208. For example, line 1210 indicates the presence of the error for builds 1216 (e.g., having build numbers 414-417). The length and position of the line 1210 relative to the X-axis 1202, for example, collectively indicate a time period in which the error existed relative to release branch stream 1208*a*. Similarly, the presence of the error is indicated in line 1212 for builds 1218 (e.g., having build numbers 102-108) for correction branch stream 1208*b*, and in line 1214 for builds 1220 (e.g., having build numbers 27-34) for development branch stream 1208*c*. For any of the lines 1210-1214, it is possible to have gaps in the respective line, e.g., if the error has disappeared, then reappeared, in the stream.

In some implementations, the graph 1200 can include an area for the presentation of a recent changes list 1222. For example, the user can select a particular build 1218 (e.g., build 1218*a* for build number 102) on the correction branch stream 1208*b*. Upon user selection of a build, for example, the recent changes list 1222 can be presented as a popup adjacent to the user's selection and containing recent change information. Information presented in the recent changes list 1222, for example, can be obtained from configuration control, bug fixes and/or other data sources and can identify specific defects that have been fixed and/or enhancements that have been made. The user can use this information, for example, to diagnose possible causes for the error. In some implementations, other types of information can be presented with, or accessible from, the graph 1200, e.g., a list of products associated with a particular error.

In some implementations, the graph 1200 can be annotated in other ways. For example, the graph 1200 can be further labeled with push information from one stream to another stream, as shown above with reference to FIGS. 7 and 8.

Figure 13:
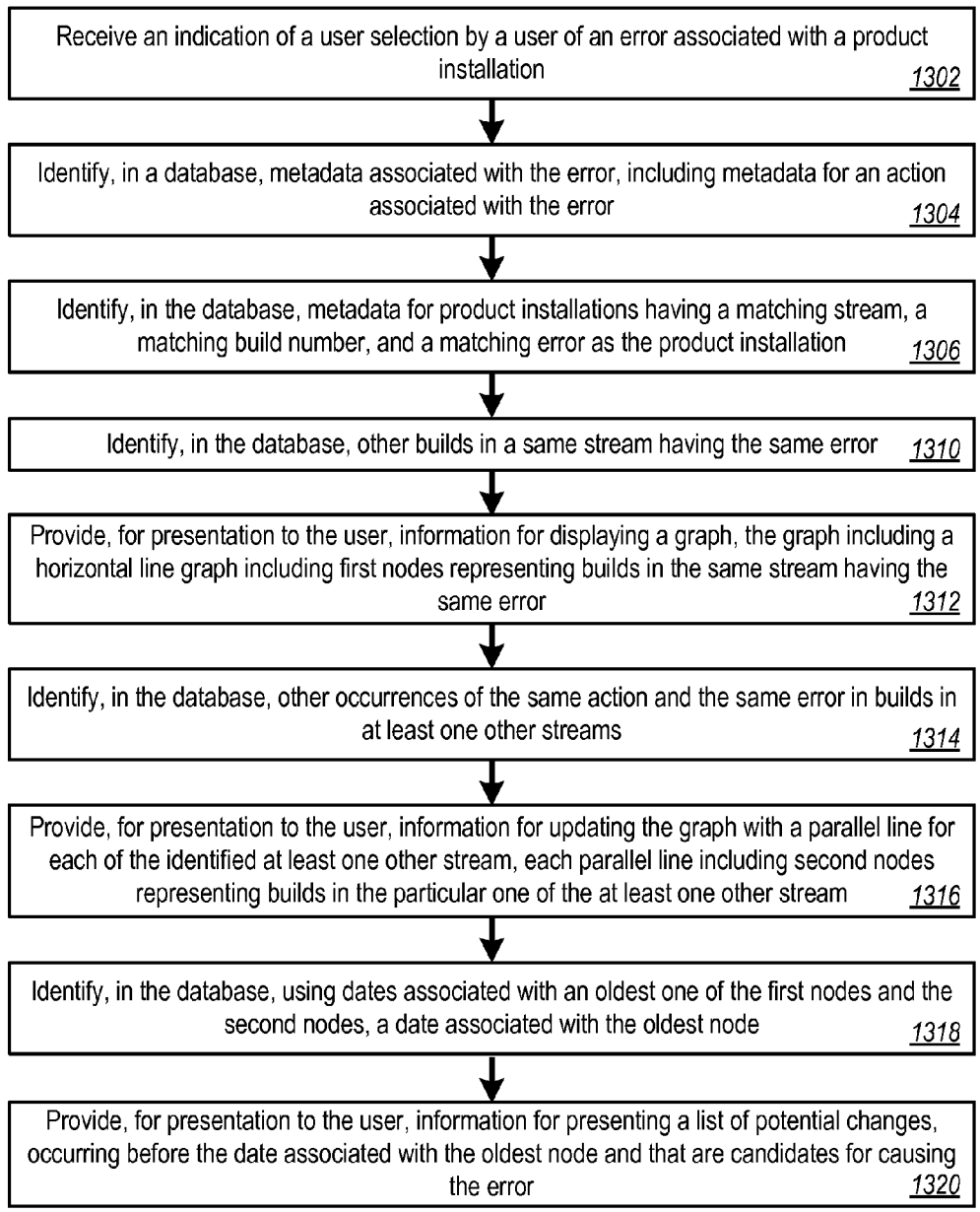
FIG. 13 is a flowchart of an example method for providing instructions operable to provide diagnostic information associated with an error.

FIG. 13 is a flowchart of an example method 1300 for providing instructions operable to provide diagnostic information associated with an error. For clarity of presentation, the description that follows generally describes method 1300 in the context of FIGS. 1-10. However, it will be understood that the method 1300 may be performed, for example, by any other suitable system, environment, software, and hardware, or a combination of systems, environments, software, and hardware as appropriate. For example, the logging system 110 and/or its components can be used to execute the method 1300, e.g., using information accessed from the tables 602-608, and in coordination with the client device 130.

At 1302, an indication is received of a user selection by a user of an error associated with a product installation. For example, the user can click an error line from a specific product installation, e.g., the specific error 501 described above with reference to FIG. 5. In another example, the user can select a particular error line from the selected installation view 206 on the dashboard 200. The user input processing module 140, for example, can handle user selections in this instance. The error selected by the user, for example, can be an error that has appeared in the release branch stream 1208*a*, such as appearing for the last few days. The time at which the user selection is made, for example, can be at a time for which the graph 1200 presents information for previously-occurring errors and builds, e.g., on or after Nov. 29, 2013 in the graph 1200, such as if the user has noticed the error in the "417" build 1216.

At 1304, metadata associated with the error is identified in a database, including metadata for an action associated with the error. As an example, the request handler 116 can receive the request and can query the log metadata 122, e.g., including the tables 602-608 associated with the schema, including using rows of the lines table 608 having "ERROR" as the LINETYPE 610. At this time, metadata associated with the error can be identified, including metadata associated with the action in which the error occurred.

At 1306, metadata is identified in a database for product installations having a matching stream, a matching build number, and a matching error as the product installation. For example, the request handler 116 can identify other products from the same stream and build number that have the same error in the same action.

In some implementations, a list of products associated with the identified metadata for the product installations is provided for presentation to the user. For example, the request handler 116 can identify other affected products for presentation to the user, such as in a separate area (not shown in FIG. 12) adjacent to the graph 1200.

At 1310, other builds in a same stream having the same error are identified in the database. For example, using information in the tables 602-608, the request handler 116 can identify other builds 1216 (e.g., build numbers 414-416) also having the same error.

At 1312, information is provided for displaying a graph for presentation to the user. The graph includes a horizontal line graph including first nodes representing builds in the same stream having the same error. For example, using information received from the logging system 110, the log exploration viewer 142 or some other application on the client device 130 can present the graph 1200, including the line 1210 showing dots for the builds 1216, labeled with respective release numbers 414-418. The line 1210 and builds 1216 can be presented with reference to time and the X-axis 1202.

At 1314, other occurrences of the same action and the same error in builds in at least one other stream are identified. For example, the request handler 116 can identify builds 1218 and 1220, associated with the correction branch stream 1208b and the development branch stream 1208c, having the same error.

At 1316, information is provided for updating the graph for presentation to the user. The information includes information for a parallel line for each of the identified at least one other stream, each parallel line including second nodes representing builds in the particular one of the at least one other stream. For example, using information provided by the logging system 110, the client device 130 can update the graph 1200 with the lines 1212 and 1214, e.g., parallel to and related by time to the line 1210. The update can happen coincidentally with the rendering of the line 1210.

At 1318, a date associated with the oldest node is identified in the database. Identification is made, for example, using dates associated with an oldest one of the first nodes and the second nodes. For example, the request handler 116 can identify the oldest build 1220a in the line 1214, identifying the first build in the development branch stream 1208c in which the error first occurred. Alternatively, as shown in FIG. 12, identification can instead be made for the first-occurring build 1218a in the line 1212, identifying the first build in the correction branch stream 1208b in which the error first occurred.

At 1320, information for presenting a list of potential changes is provided for presentation to the user. For example, the information is presented for changes occurring before the date associated with the oldest node and that are candidates for causing the error. For example, the recent changes list 1222 can be displayed that identifies recent changes leading up to the build 1218a. Information associated with the recent changes can be identified, for example, by the request handler querying information in the software development information 124.

In some implementations, the process 1300 can further include

In some implementations, the user can select any one of the builds 1216-1220 for which to present recent changes information. For example, based on user inputs entered on the client device 130 when the graph 1200 is presented, the logging system 110 can receive an indication of a user selection by a user of a particular build 1216-1220 in one of parallel lines in the graph, e.g., any of the lines 1210-1214. The request handler 116 can query software development information 124 for recent changes that occurred before the selected build, each being a potential candidates for causing the error. The information can be provided by the logging system 110 to the client device 130 for presentation to the user, e.g., in the recent changes list 1222, providing, for presentation to the user, information for presenting a list of the recent changes.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer system, comprising:
   at least one processor;
   a logging system including instructions operable, during execution at least one processor, to collect a plurality of logs associated with software builds for plural systems;
   a dashboard viewer operable, during execution by the at least one processor, to:
      present a dashboard that includes:
         build information for a subset of the builds using at least the collected logs; and
         hierarchical selection controls for selecting information to display for the subset of the builds;
      receive, from inputs on the hierarchical selection controls, a selection of a stream and a build number from the subset of the builds;
      receive, from inputs on the hierarchical selection controls and from a list of builds matching the selected stream and build number, a selection of a given build;
      identify specific errors in at least one of the given build and statistics for the given build;
      provide associated build information including information for past builds related to the given build; and receive user inputs from a user, including user selections for one or more logs to be displayed; and
access log information associated with the user selections; and
a log exploration viewer operable to:
display and navigate particular logs associated with a given build;
receive a selection of a given error in a given log;
identify other builds in which the same error has previously occurred, wherein identifying the other builds includes:
querying, in a table of a database, line information for lines in the given log containing the given error, the line information including execution identifiers for builds; and
identifying, using at least the line information, at least one other stream, build, product, or platform associated with the error; and
provide, for display to the user, information associated with the other builds.

2. The computer system of claim 1, wherein build information includes at least one of: a build stream name, a build revision identifier, an error count, a previous build error count, and an older build error count.

3. The computer system of claim 1, wherein the presented dashboard includes log selection controls and at least one log panels for providing log information, including, for each error occurring in the build for that log, a line number, a timestamp, and an error message.

4. The computer system of claim 3, wherein the log information includes, for each of particular lines in the log, a line number, a timestamp, and specific log text identifying one or more errors.

5. The computer system of claim 1, wherein the plural systems are located in remote locations, and wherein collecting the logs includes receiving the logs from the plural systems and storing the collected logs in an in-memory data store.

6. The computer system of claim 1, wherein the log exploration viewer presents a particular log with collapsible sections.

7. The computer system of claim 1, wherein the log exploration viewer presents two related logs in a side-by-side viewer, the presentation providing a comparison highlighting differences between the two related logs.

8. The computer system of claim 1, wherein providing related build information further includes analyzing associated logs to provide instructions for presenting a chart pictorially displaying, for the given error selected by the user, paths relative to plural software development streams, the paths associated and labeled with named software development paths, the chart including names of each path and including dates associated with milestones in each path, including related to error lifespan.

9. The computer system of claim 8, wherein the chart is presented chronologically and identifies specific builds and dates where the given error existed.

10. The computer system of claim 1, wherein information presented for a selected build includes a package name, a platform name, an install type, an install time, an overall error count, an old error count, and an older error count.

11. A computer-implemented method for, comprising:
receiving, from different locations, logs associated with a plurality of builds at the different locations and associated with plural systems;
storing the logs in a centralized location;
generating build information for a given build, including identifying errors associated with the given build, wherein generating build information includes:
analyzing information for a current log associated with the given build, including accessing information for previous logs associated with previous related builds related to the given build; and
determining, using at least the analyzing, error diagnostic information to be presented, including an analysis of errors that occurred in the given build and previous related builds; and
providing instructions operable to present the error diagnostic information to a user, including providing log information, for presentation in a user interface, the user interface providing a dashboard viewer operable to:
present a dashboard that includes:
the build information for a subset of the builds using at least the collected logs; and
hierarchical selection controls for selecting information to display for the subset of the builds;
receive, from inputs on the hierarchical selection controls, a selection of a stream and a build number from the subset of the builds;
receive, from inputs on the hierarchical selection controls and from a list of builds matching the selected stream and build number, a selection of a given build;
identify specific errors in at least one of the given build and statistics for the given build;
provide associated build information including information for past builds related to the given build; and
receive user inputs from a user, including user selections for one or more logs to be displayed; and
access log information associated with the user selections; and
providing instructions operable to present a log exploration viewer operable to:
display and navigate particular logs associated with a given build;
receive a selection of a given error in a given log;
identify other builds in which the same error has previously occurred, wherein identifying the other builds includes:
querying, in a table of a database, line information for lines in the given log containing the given error, the line information including execution identifiers for builds; and
identifying, using at least the line information, at least one other stream, build, product, or platform associated with the error; and
provide, for display to the user, information associated with the other builds.

12. The method of claim 11, wherein each log includes metadata associated with the log and log entries, each log entry including a timestamp.

13. The method of claim 11, wherein storing the logs includes storing information for the logs in a schema.

14. The method of claim 11, wherein providing log information includes providing the log with annotations and collapsible sections.

15. The method of claim 11, wherein providing log information includes presenting two related logs in a side-by-side viewer with a comparison tool that highlights differences between the two related logs.

16. The computer system of claim 1, wherein the log exploration viewer is further operable to:

determine, using the given error, a defect report associated with the given error; and provide a link navigable to a defect tracking system, the link linking to an existing defect report associated with the given error.

17. The method of claim 11, wherein the log exploration viewer is further operable to:

determine, using the given error, a defect report associated with the given error; and provide a link navigable to a defect tracking system, the link linking to an existing defect report associated with the given error.

* * * * *